United States Patent
Bayer et al.

(10) Patent No.: US 7,192,355 B2
(45) Date of Patent: Mar. 20, 2007

(54) COUPLING FOR CONNECTING TWO COMPONENTS

(75) Inventors: Thomas Bayer, Igersheim (DE); Christof Old, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 80 days.

(21) Appl. No.: 10/474,888

(22) PCT Filed: Feb. 8, 2002

(86) PCT No.: PCT/EP02/01320

§ 371 (c)(1),
(2), (4) Date: Apr. 4, 2004

(87) PCT Pub. No.: WO02/084134

PCT Pub. Date: Oct. 24, 2002

(65) Prior Publication Data

US 2004/0162149 A1    Aug. 19, 2004

(30) Foreign Application Priority Data

Apr. 14, 2001   (DE)   ................. 101 18 562

(51) Int. Cl.
*F16D 3/66*   (2006.01)

(52) U.S. Cl. .................. 464/79; 464/101; 464/162

(58) Field of Classification Search ............. 464/79, 464/100, 101, 162, 80; 403/304, 314, 329; 285/229
See application file for complete search history.

(56) References Cited

U.S. PATENT DOCUMENTS

| | | | | |
|---|---|---|---|---|
| 1,606,514 A | * | 11/1926 | Crist | 464/80 |
| 1,871,227 A | * | 8/1932 | Smith et al. | 464/79 |
| 1,937,239 A | * | 11/1933 | McWane | 285/229 |
| 3,024,629 A | * | 3/1962 | Raskhodoff | 464/79 |
| 3,346,945 A | * | 10/1967 | Chalpin et al. | 464/79 X |
| 3,682,501 A | * | 8/1972 | Burcin et al. | 285/229 X |
| 3,754,411 A | * | 8/1973 | Orain | 464/79 |
| 3,934,486 A | * | 1/1976 | Becker et al. | 464/101 X |
| 4,265,099 A | * | 5/1981 | Johnson et al. | 464/79 X |
| 5,407,386 A | | 4/1995 | Kish et al. | |
| 5,755,622 A | * | 5/1998 | Kanki et al. | |

FOREIGN PATENT DOCUMENTS

| | | | | |
|---|---|---|---|---|
| DE | 629625 | * | 5/1936 | 464/79 |
| EP | 0 627 571 | | 12/1994 | |
| FR | 695949 | * | 12/1930 | 464/79 |
| GB | 841793 | * | 7/1960 | 464/79 |
| GB | 2 244 763 | | 12/1991 | |

* cited by examiner

*Primary Examiner*—Greg Binda
(74) *Attorney, Agent, or Firm*—Bachman & LaPointe, P.C.

(57) ABSTRACT

A coupling for connecting two components, in particular a clamping collar with a centering hub, whereby, between both components an axially deformable and radially centering element is arranged.

8 Claims, 3 Drawing Sheets

COUPLING FOR CONNECTING TWO COMPONENTS

BACKGROUND OF THE INVENTION

The present invention relates to a coupling for the connection of two components, in particular of a clamping hub to a centering hub, an axially deformable element being provided between the two components.

Couplings of this type are known and obtainable on the market in the most diverse possible forms and versions. Mostly, they are known as rigid couplings or as rotationally rigid compensating couplings for transmitting an introductory torque from one component to a second component.

One disadvantage, however, is that conventional couplings, for example as regards claw couplings, are extremely costly to produce.

Another disadvantage is that, in the case of conventional couplings, a torque cannot be transmitted, free of play, from one component to a second component. This is necessary particularly in the event of connection to high-precision gear units, servomotors or the like. Yet another disadvantage is that linear radial guidance of the components to be connected usually entails some play, this likewise being undesirable.

Furthermore, in the prior art, concertina couplings are known, which require a large installation space, have a long design and are costly to produce. They prevent a compact form of installation and in no way ensure centering. They have three degrees of freedom, which is undesirable.

U.S. Pat. No. 5,407,386 discloses a shaft/hub connection, a coupling being provided between the two components to be connected. This coupling serves merely for axial length compensation.

The object on which the present invention is based is to provide a coupling of the type initially mentioned, which eliminates the disadvantages mentioned and by means of which a torque can be transmitted from one component to a second component in a highly cost-effective, simple and effective way, free of play and with absolute precision, while at the same time a length change due, for example, to thermal expansion of one component or the other in the axial direction is to be compensated.

Moreover, a radial torque is to be transmitted, absolutely free of play, from one component to a second component in a virtually torsionally rigid manner. In addition, a coupling of this type is to be capable of being produced free of maintenance and of wear and, in particular, cost-effectively.

SUMMARY OF THE INVENTION

The foregoing object is achieved by the present invention, wherein the element is inserted, and, in particular, welded, between two components, in particular between two clamping hubs and a centering hub for forming the coupling. The element has preferably a U-like design as a concertina and possesses two annular elements which are connected on the end face to a U-like connecting element. A gap is formed between the two annular elements. The element is preferably welded firmly on the end face to the first component, on the one hand, and to the second component, on the other hand. The element is preferably laser-welded to the components over the entire circumference.

This results in a rotationally rigid radial connection or coupling of the components to one another, so that these can be moved relative to one another, free of play radially and in a rotationally rigid manner.

In the present invention, it is advantageous that an extremely short construction space can be implemented by means of a coupling of this type. This coupling at the same time allows radial centering with and/or without a guide element, guide sleeve or the like. This centering also remains permanently ensured. Moreover, centering can at the same time be carried out between the two components via the centering element which allows axial movement. This is an appreciable advantage in the present invention.

Particularly in the case of high-precision components, such as, for example, planetary gear units, as are described in DE 44 01 164.4, an electric drive, servomotor or the like serves as a drive element which introduces the torque with high precision via a clamping hub. Since the clamping hub is connected fixedly in terms of rotation as a coupling to the second component or a centering hub via the element, in particular the concertina, the components or clamping hub can be moved axially back and forth with respect to the centering hub as a result of the corresponding shape of the element. This is necessary particularly when, for example, the centering hub, as a component of a gear unit element, changes its length due to thermal expansion and heating. At the same time, during the heating of the drive shaft of a drive unit of a, for example, electric motor or servomotor, a length change or dilatation of the clamping hub or of the drive shaft of the motor may occur. A corresponding dilatation of this kind can then be compensated via the corresponding gap of the element.

BRIEF DESCRIPTION OF THE DRAWINGS

Furthermore, it has proved advantageous to additionally provide linear radial guidance of the two components in relation to one another, in that, for example, a step of a first component engages with an exact fit into a hollow-shaft step provided correspondingly for this purpose, a compensating gap being formed on the end face. Instead of a step, centering sleeves, centering pins or the like may also be provided, in order to rule out a radial displacement or movement of the components. These can be moved only axially in relation to one another.

Further advantages, features and details of the invention may be gathered from the following description of preferred exemplary embodiments and with reference to the drawing in which.

DETAILED DESCRIPTION

Figure 1:
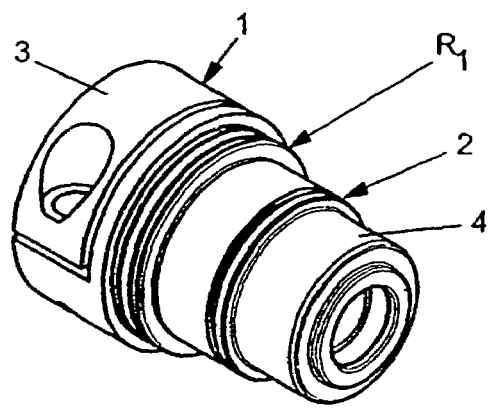
FIG. 1: shows a perspective illustration of a coupling for the connection of a clamping hub to a centering hub.

According to FIG. 1, a coupling $R_1$ connects a first component 1 to a second component 2, in the preferred exemplary embodiment the component 1 being designed as a clamping hub 3 and the component 2 as a centering hub 4. The clamping hub 3 and centering hub 4 are connected to one another via the coupling $R_1$.

Figure 2:
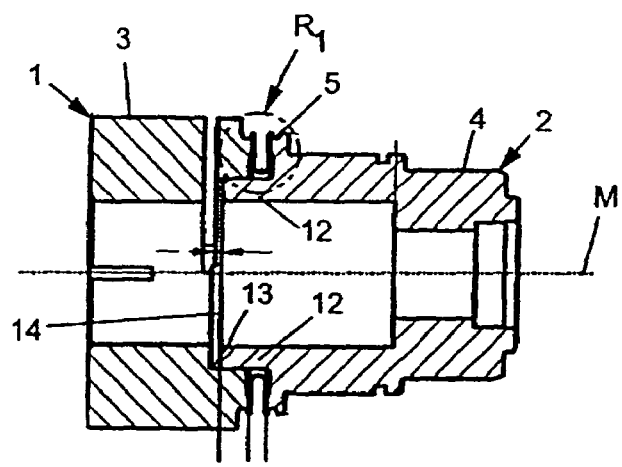
FIG. 2: shows a longitudinal section through the coupling, clamping hub and centering hub according to FIG. 1.
Figure 3:
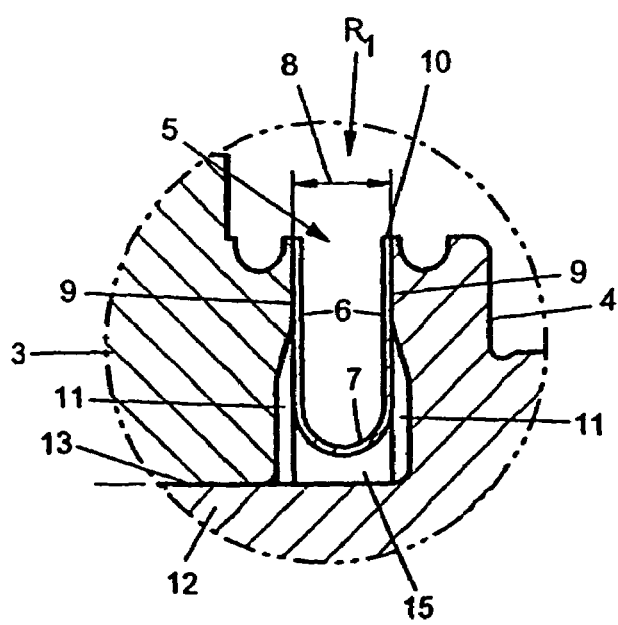
FIG. 3: shows a detail, illustrated enlarged, of the part longitudinal section in the region of the coupling according to FIG. 2.

In this case, the coupling $R_1$ has an element 5 which is designed as a concertina. Furthermore, the element 5 has two annular elements 6, as are indicated in FIGS. 2 and 3, and which are arranged preferably parallel and axially next to one another. The annular elements 6 are connected to one another on the end face inwardly toward a center axis M via a connecting element 7 (see FIG. 5). The annular elements 6 and the connecting elements 7 preferably consist of a component which, cross-sectionally, has a U-like design. The element 5 preferably has an annular design, a gap 8 being formed between the annular elements 6.

In the preferred exemplary embodiment, outer annular faces 9 and/or end faces 10 of the element 5 are firmly welded in each case to the component 1, 2 or clamping hub 3 and centering hub 4. Welding preferably takes place over the entire circumference. However, one end face 10 may also be firmly welded, in particular laser-welded, at least partially peripherally, preferably entirely peripherally, to the clamping hub 3 at one end and to the centering hub 4 at the other end. This results in a coupling $R_1$, in which the components 1, 2 are firmly connected to one another unreleasably and fixedly in terms of rotation.

It has proved particularly advantageous, furthermore, to provide in each case a recess 11 on the end face in the clamping hub 3 and the centering hub 4, particularly in the region of the connecting element 7 of the element 5, so that, during the axial movement of the component 1 in relation to the component 2, the element 5 can be pressed together to a minimal extent. In this case, in particular, the region of the connecting element 7 and a part region of the annular elements 6 remain exposed due to the recesses 11.

An important advantage in the present invention is that, since the annular elements 6 are completely secured to the components 1, 2 radially, the element 5 can transmit extremely high torques from the clamping hub 3 to the centering hub 4, for example, for insertion into or flanging onto a gear unit.

So that, during the axial movement of the component 1 with respect to the component 2, exact guidance is ensured at the same time, a shaft step 12 of the centering hub 4 engages with an exact fit into a corresponding hollow-shaft step 13 of the clamping hub 3. In this case, a compensating gap 14 is formed on the end face between the shaft step 12 and the hollow-shaft step 13. This ensures that an exact guidance of the two components 1, 2 in the axial direction remains ensured.

It is also to come within the scope of the invention, however, that, for example, a corresponding step below the element 5 engages down from the clamping hub 3 and into a corresponding hollow-shaft step, not designated here, of the centering hub 4.

Furthermore, as may be gathered particularly from FIG. 3, a free space 15 is formed between the step 12 and the element 5.

It is also advantageous in the present invention that, for example, a drive shaft, not illustrated here, for example of an electric motor, can engage into the clamping hub 3. It is also to be envisaged to introduce a drive shaft not only into the clamping hub 3, but also into the centering hub 4.

Figure 4A:
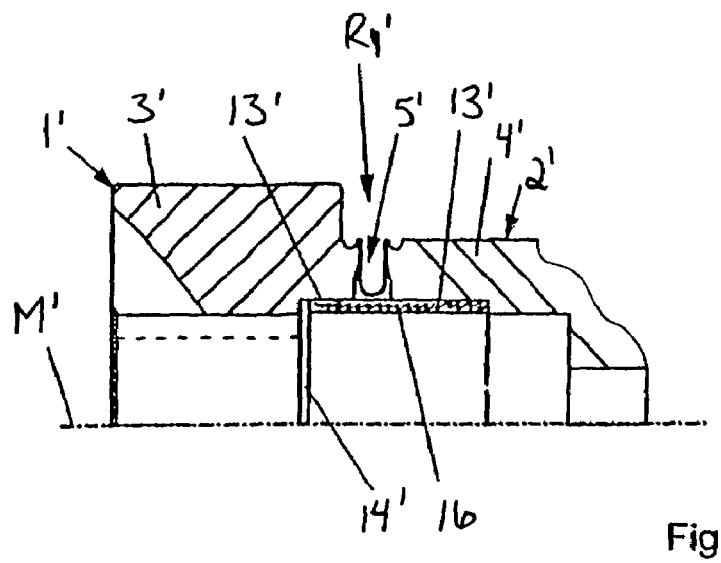
FIG. 4a and FIG. 4c: show a part longitudinal section through a further exemplary embodiment of the coupling with clamping hub and centering hub, with and without radial guidance.

In a further exemplary embodiment of the present invention according to FIG. 4a, the coupling $R_1'$, in particular the element 5', is connected to the components 1' and 2' or to the clamping hub 3' and centering hub 4' in the way described above. The difference is that, in the region of the element 5', the clamping hub 3' and the centering hub 4', which are preferably likewise designed as a hollow shaft, have in each case a hollow-shaft step 13', into which a centering sleeve 16 is inserted with an exact fit, the compensating gap 14' being formed on the end face toward the clamping hub 3'. In this case, a drive shaft, not illustrated here, may engage into the clamping hub 3' and, if appropriate, also into the centering hub 4'.

Figure 4B:
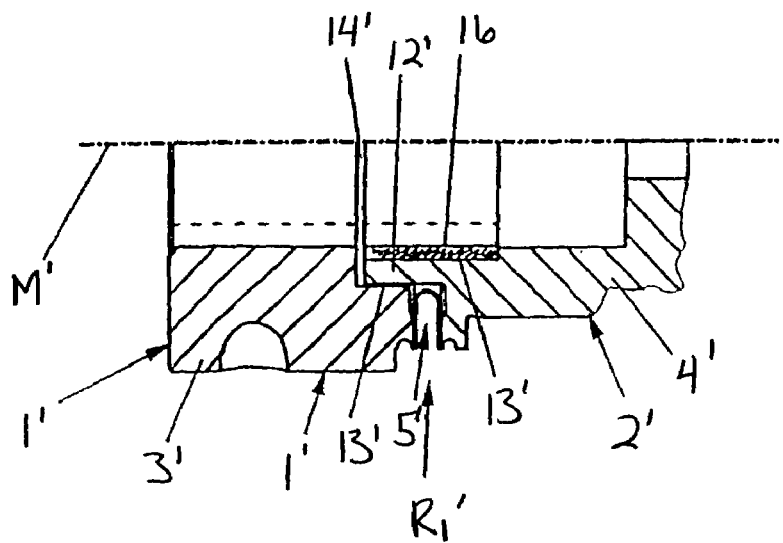
FIG. 4b: shows a part longitudinal section according to FIG. 4a as a further exemplary embodiment.
Figure 4C:
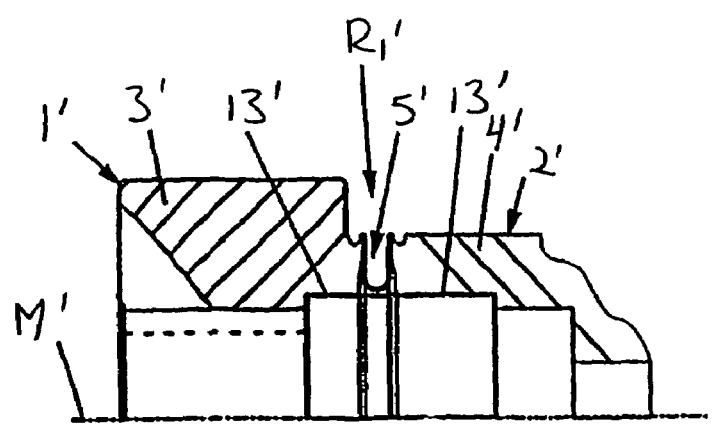

FIG. 4c shows a coupling $R_1'$ which corresponds approximately to the exemplary embodiment according to FIG. 4a. Here, however, there is no centering sleeve 16 provided, since the element 5' is designed to be self-centering. This embodiment likewise ensures a very short installation space and a centering of the two components in relation to one another in the radial direction.

According to the exemplary embodiment shown in FIG. 4b, the shaft step 12' is introduced into the hollow-shaft step 13' of the clamping hub 3'. The compensating gap 14' is formed on the end face between the step 12' and the clamping hub 3. A further particular feature, here, is that a further hollow-shaft step 13', which receives a centering sleeve 16, is provided in the centering hub 4' in the end-face region, particularly in the region of the shaft step 12'. In this case, a drive shaft, not illustrated in any more detail here, may be received in the region of the clamping hub 3' and centering hub 4' in the region of the centering sleeve 16, in order to ensure additional axial guidance for the movement of the components 1', 2' in relation to one another.

Figure 5:
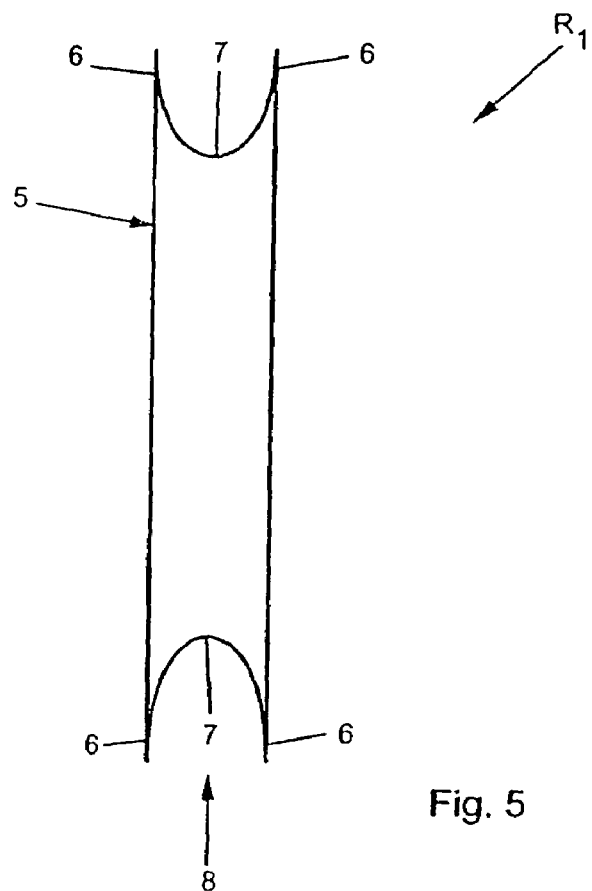
FIG. 5: shows a top view of the coupling according to FIGS. 1 to 4b.

FIG. 5 illustrates as a top view the element 5, in particular the coupling $R_1$, which preferably has a ring-like design.

Figure 6:
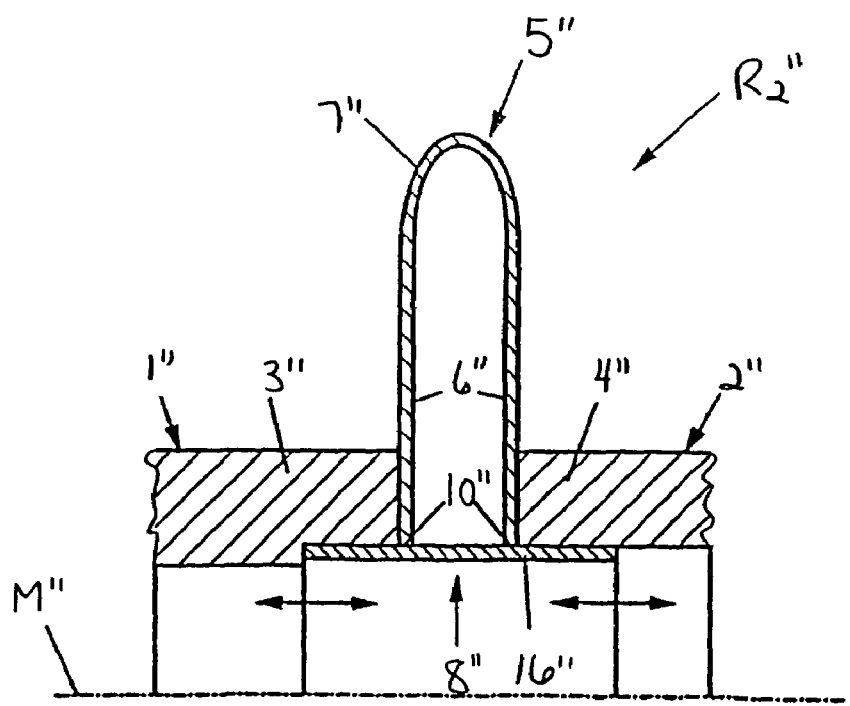
FIG. 6: shows a part longitudinal section through a further exemplary embodiment of a further coupling, together with radial guidance.

FIG. 6 shows a further exemplary embodiment of a coupling $R_2''$ which, as the element 5'', likewise consists of annular elements 6'' which, however, are connected on the end face to an outer connecting element 7''. The gap 8'' is directed inward. For radial centering, the centering sleeve 16'' can be inserted in the region of the element 5'' in the way described above. Instead of the centering sleeve 16'', centering pins or suchlike elements may also be provided for the radial centering and guidance of the components 1'', 2''. The invention is not to be restricted to these.

The invention claimed is:

1. A coupling for the connection of two components comprising:
    a clamping hub;
    a centering hub;
    a recess on an end face of each of the clamping hub and the centering hub, such that the components are movable axially in relation to one another and are centered radially, wherein, for the radical centering of the clamping hub with respect to the centering hub, the clamping hub at least partially engages axially with an exact fit into the centering hub or the centering hub at least partially engages axially with an exact fit into the clamping hub; and
    a unitary, axially deformable element provided between the centering hub and the clamping hub, wherein the deformable element is U-shaped in cross section and is located between and welded to each end face of the centering hub and the clamping hub in a radially rigid manner.

2. The coupling as claimed in claim 1, wherein the unitary deformable element comprises two annular elements which are spaced apart axially from one another and which are connected to one another on an end face, on the inside or on the outside, via at least one connecting element, in which case the two annular elements are connected to one another peripherally via the connecting element, and a gap is formed outwardly on the face between the two annular elements.

3. The coupling as claimed in claim 2, wherein the first annular element is firmly connected to the clamping hub and the second annular element is firmly connected to the centering hub.

4. The coupling as claimed in claim 3, wherein the first annular element and second annular element are firmly welded to the clamping hub and the centering hub, respectively.

5. The coupling as claimed in claim 2, wherein each recess is formed in the region of the at least one connecting element on the end face of the clamping hub and/or the centering hub, and the least one connecting element is spaced axially apart from the clamping hub and/or the centering hub in the region.

6. The coupling as the claimed in claim 1, wherein the deformable element is a ring and U-shaped concertina.

7. The coupling as claimed in claim 1, wherein, for radial centering between the clamping hub and the centering hub, at least one centering element is inserted with an exact fit, wherein axial movement of the clamping hub with respect to the centering hub, with the deformable element inserted between them, is permitted via a compensating gap.

8. The coupling as claimed in claim 7, wherein the clamping hub and the centering hub are designed as a hollow shaft, the centering element comprises a shaft step in the centering hub which engages in a corresponding hollow-shaft step of the clamping hub for radial centering, wherein the compensating gat is formed between the shaft step and the clamping hub.

* * * * *